United States Patent [19]

Yoshida et al.

[11] Patent Number: 5,267,482
[45] Date of Patent: Dec. 7, 1993

[54] SPEED REDUCING DEVICE FOR ELECTRICAL EQUIPMENT

[75] Inventors: Masao Yoshida, Yabutsukahon; Takao Ochiai, Tochigi; Tadashi Aoyama; Yuji Hagiwara, both of Gunma; Shigehiro Maita, Kiryu, all of Japan

[73] Assignee: Mitsuba Electric Manufacturing Co., Ltd., Kiryu, Japan

[21] Appl. No.: 901,693

[22] Filed: Jun. 22, 1992

[30] Foreign Application Priority Data

Jun. 21, 1991 [JP] Japan .................. 3-055728[U]

[51] Int. Cl.$^5$ .................................... F16D 3/68
[52] U.S. Cl. ........................... 74/425; 464/73; 464/92; 464/149
[58] Field of Search ............... 74/411, 425; 464/73, 464/92, 149, 150, 152, 155, 180

[56] References Cited

U.S. PATENT DOCUMENTS

| | | | |
|---|---|---|---|
| 3,406,583 | 10/1968 | Baier | 74/425 |
| 3,635,100 | 1/1972 | Littmann | 74/425 X |
| 4,269,080 | 5/1981 | Fischer | 74/425 |
| 4,699,017 | 10/1987 | Periou | 74/425 |
| 4,748,865 | 6/1988 | Umezawa et al. | 74/411 |
| 4,813,303 | 3/1989 | Beezer et al. | 74/425 |
| 4,899,608 | 2/1990 | Knappe et al. | 74/425 X |
| 5,178,026 | 1/1993 | Matsumoto | 74/425 X |

FOREIGN PATENT DOCUMENTS 60-73982 4/1985 Japan.
62-82457 4/1987 Japan.

Primary Examiner—Leslie A. Braun
Assistant Examiner—William O. Trousdell
Attorney, Agent, or Firm—Oliff & Berridge

[57] ABSTRACT

A speed reducing device employs dampers which are provided for power transmission from a worm wheel engaged with a worm gear to an output shaft of the device so as to absorb shocks. The device does not require a metallic plate to which the dampers are adhered nor a bearing which specifically supports the output shaft. A first wheel is engaged with the worm gear and has protrusions on its plate surface facing a second wheel. The second wheel is rigidly connected to the output shaft and has protrusions on its plate surface facing the first wheel. The protrusions of the first and second wheels take complementary positions, in which each protrusion of one wheel is apart from the adjacent protrusion of the other wheel a predetermined distance with respect to the rotational direction. The dampers are provided between neighboring protrusions of the first and second wheels so that the dampers are pressed and contracted to elastically transmit power from the first wheel to the second wheel.

11 Claims, 7 Drawing Sheets

SPEED REDUCING DEVICE FOR ELECTRICAL EQUIPMENT

BACKGROUND OF THE INVENTION

1. Field of the Invention

The present invention relates to a speed reducing device for electrical equipment used in a vehicle, such as an automobile, a bus or a truck.

2. Description of the Related Art

Usually, a speed reducing device of this kind employs a rubber damper which is provided as a power transmitter from a worm wheel engaged with a worm gear on a motor shaft to an output shaft of the device so as to absorb shocks. Such a speed reducing device is disclosed in Japanese Patent Laid-Open No. 60-73982 and Japanese Utility Model Laid-Open No. 62-82457. The basic construction of such a device is shown in FIG. 7. A casing 10 has a cylindrical hub portion 10a. An output shaft 11 is placed through the hub portion 10a and is rotatably supported by a bearing 12 provided on the inner periphery of the hub portion 10a. A worm wheel 14, engaged with a worm gear 13, is rotatably supported on the outer periphery of the hub portion 10. A plate 15 is coupled to the worm wheel 14, and another plate 16 is rigidly connected to the output shaft 11. The plate 15 and the plate 16 are connected by means of a rubber damper 17, which is elastically twisted to absorb shocks in power transmission from the worm wheel 14 to the output shaft 11.

However, when the rubber damper 17 is twisted, the axial ends thereof, i.e., the portions attached to the plates, receive substantial stress. If adhesion between the rubber damper and the plates is not sufficiently strong, the rubber damper may separate from the plates. In addition, the plates must be formed of a material having substantial strength, such as a metallic material. The output shaft 11 requires a bearing provided solely for the output shaft, in order to mount it on the casing. These circumstances prevent reduction of the weight of the device.

SUMMARY OF THE INVENTION

The present invention is intended to solve the above problems. It is an object of the present invention to provide a speed reducing device for electrical equipment, comprising: a casing having a central hub portion; a worm gear provided on a motor shaft; a first wheel comprising a first hub portion rotatably supported on an outer periphery of the central hub portion of the casing, a circumferential cylindrical portion having a wheel gear which engages with the worm gear so as to reduce the rotational speed, and a protrusion provided on a plate surface thereof; an output shaft for outputting power from the device; a second wheel being rigidly connected to or formed together with the output shaft and comprising a second hub portion rotatably supported on an inner periphery of the central hub portion of the casing, a circumferential cylindrical portion which slidably supports an inner periphery of the circumferential cylindrical portion of the first wheel, and a protrusion provided on a plate surface, wherein the second wheel and the first wheel are placed so that the plate surface of the second wheel having the protrusion and the plate surface of the first wheel having the protrusion face each other and so that the protrusion of the second wheel and the protrusion of the first wheel are apart from each other a predetermined distance with respect to the rotational direction; and dampers provided between the protrusion of the first wheel and the protrusion of the second wheel so as to be contracted to elastically transmit power from the first wheel to the second wheel.

In the above construction, since power transmission shocks are absorbed by contraction of the damper instead of twisting thereof, a metallic plate is not required. Also, the output shaft can be mounted in the casing without employing a bearing solely for the output shaft.

BRIEF DESCRIPTION OF THE DRAWINGS

Further objects, features and advantages of the present invention will become apparent in the following description of the preferred embodiments with reference to the attached drawings wherein.

DETAILED DESCRIPTION OF THE PREFERRED EMBODIMENTS

Figure 1:
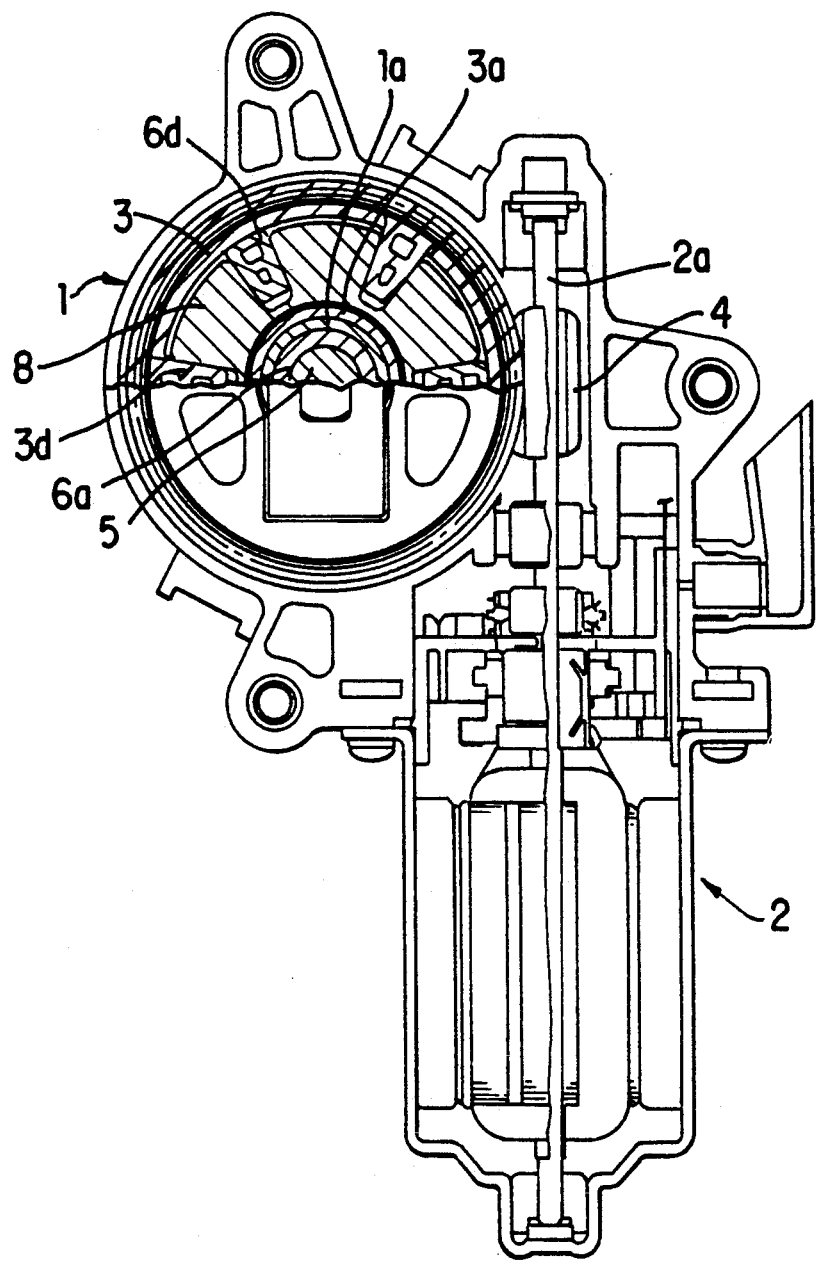
FIG. 1 is a front elevation of an actuator for electrical equipment, partly sectioned to show a portion of a speed reducing device according to the first embodiment of the present invention.
Figure 2:
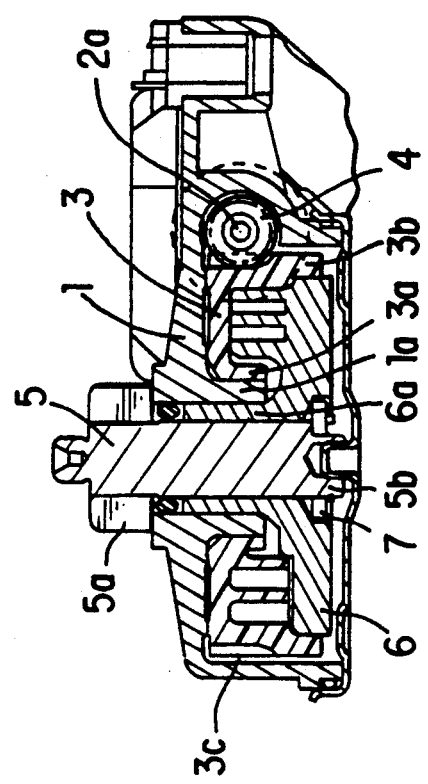
FIG. 2 is a horizontal sectional view of the speed reducing device shown in FIG. 1.
Figure 3A:
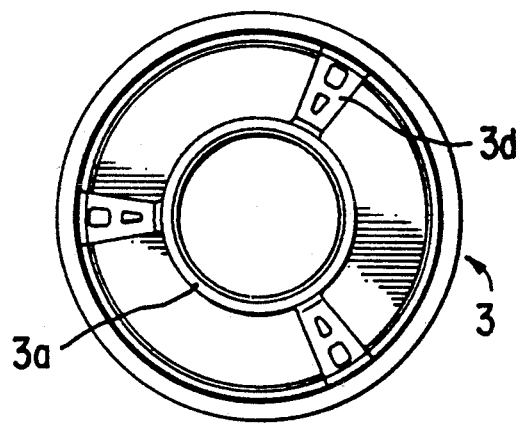
FIG. 3(A) is a front elevation of a first wheel according to the first embodiment of the present invention.
Figure 3B:
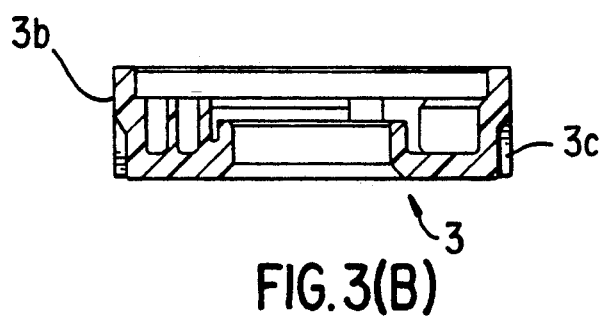
FIG. 3(B) is a horizontal sectional view thereof.
Figure 3C:
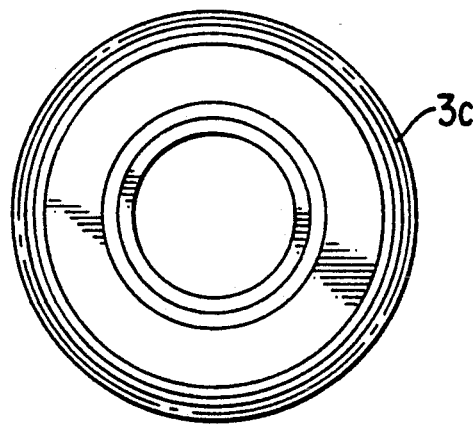
FIG. 3(C) is a rear elevation thereof.
Figure 4B:
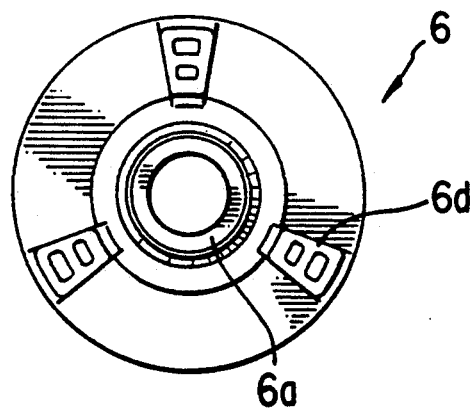
FIG. 4(B) is a rear elevation thereof.
Figure 4A:
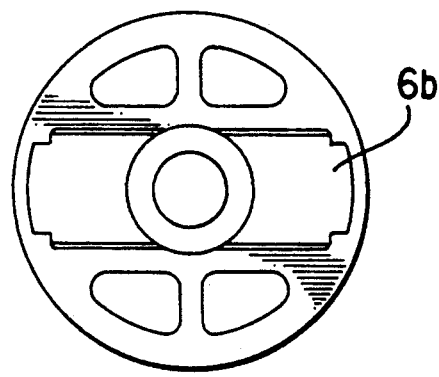
FIG. 4(A) is a front elevation of a second wheel according to the first embodiment.
Figure 4C:
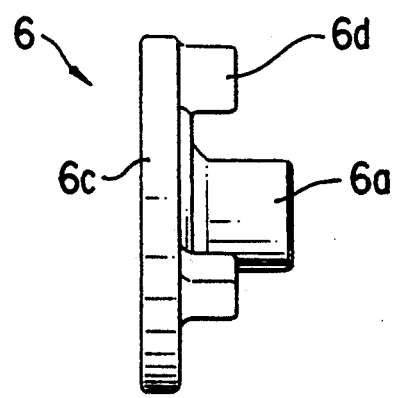
FIG. 4(C) is a side elevation thereof.
Figure 5A:
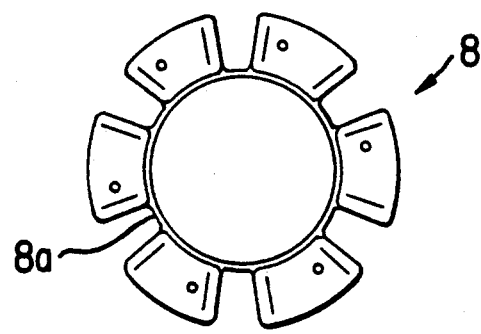
FIG. 5(A) is a front elevation of a rubber unit according to the first embodiment.
Figure 5B:
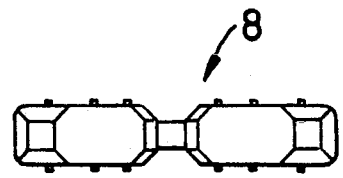
FIG. 5(B) is a plan view thereof.

One embodiment of the present invention will be described below with reference to FIGS. 1 through 5. A casing 1 houses a speed reducing device for reducing the speed of the output of a motor 2. A cylindrical central hub portion 1a protrudes from the casing 1. The central hub portion 1a rotatably supports a first wheel 3. A cylindrical first hub portion 3a of the first wheel 3 is slidably fitted over the outer periphery of the hub portion 1a. The first wheel 3 is formed of an appropriate resin and has a circumferential cylindrical portion 3b as well. The outer periphery of the circumferential cylindrical portion 3b is cut to form a wheel gear 3c, which engages with a worm gear 4 rigidly connected to a motor shaft 2a of the motor 2.

An output shaft 5 is formed together with an output gear 5a at a front end thereof by cold forging. A base portion of the output shaft 5 is cut to form a cut portion 5b having two flat surfaces. A rectangular coupling plate 7 is fitted on the cut portion 5b so that the coupling plate 7 does not rotate around the output shaft 5. The output shaft 5 is rotatably fitted through a cylindrical second hub portion 6a of a second wheel 6. The second wheel 6 and the output shaft 5 are coupled by fitting the rectangular coupling plate 7 into a stopping groove 6b on the second wheel 6 so that they do not rotate with respect to each other. The second hub portion 6a of the second wheel 6 is rotatably fitted inside the central hub portion 1a of the casing 1. When the second wheel 6 is thus mounted in the casing 1, a circumference portion 6c of the second wheel 6 is in contact with the inner periphery of the circumferential cylindrical portion 3b of the first wheel 3 so as to slidably support the first wheel 3.

The facing surfaces of the first and second wheels 3, 6 have three protrusions 3d, 6d, respectively. Each set of the three protrusions 3d and 6d are angularly arranged on the respective surfaces with intervals of a predetermined distance measured in the rotational direction. When the first and second wheels 3, 6 are assembled, the protrusions 3d and 6d of the first and second wheels 3, 6 take complimentary positions. In detail, each protrusion of one wheel takes a position substantially in the middle between two protrusions of the other wheel. Six dampers 8 are inserted between neighboring protrusions 3d and 6d. When the motor 2 rotates the first wheel 3, the protrusions 3d press the dampers 8 toward the protrusions 6d so that power is elastically transmitted from the first wheel 3 to the second wheel 6. The dampers 8 are all connected by a connecting ring 8a, which is formed of the same material as that of the dampers 8.

In the above construction, power is transmitted from the motor shaft 2a through the first wheel 3, the dampers 8 and the second wheel 6 to the output shaft 5. The dampers 8 of this transmission line are provided between the protrusions 3d and 6d which are angularly arranged on the respective wheels and take the above-described complimentary positions. When power is transmitted from the first wheel 3 to the second wheel 6, the dampers 8 are pressed and contracted in the rotational direction between the protrusions 3d and 6d to absorb shocks, i.e., to elastically transmit power. Therefore, unlike the conventional art in which a rubber damper is twisted to elastically transmit power, the dampers 8 do not need to be adhered to plates, but they are simply placed between the protrusions 3d and 6d, according to this embodiment of the present invention. Product quality becomes consistent and reliable. Also, since the plate to which the damper 8 is adhered is unnecessary, the weight of the device can be reduced.

Further, since the first wheel 3 having a wheel gear 3c is supported at its first hub portion 3d by the central hub portion 1a of the casing 1 and at its circumferential cylindrical portion 3b by the circumferential portion 6c of the second wheel 6, which is rigidly connected to the output shaft 5, the first wheel 3 hardly deforms despite the load caused by the engagement with the worm gear 4. Thus, smooth power transmission by the gear engagement is ensured. Similarly, the second wheel 6 is supported at its second hub portion 6a by the central hub portion 1a of the casing 1 and at its circumferential portion 6c by the first wheel 3, which is supported by the casing 1. Since the second wheel 6 is thus supported by two sites, the output shaft 5 does not require a bearing which, according to the conventional art, is required in order to mount the output shaft in the casing. The number of the parts can be reduced and, therefore, the weight of the device can be reduced.

Figure 6:
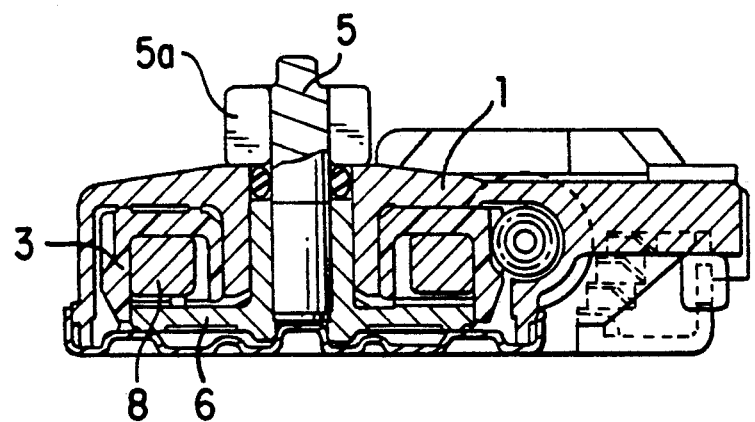
FIG. 6 is a horizontal sectional view of a speed reducing device according to the second embodiment of the present invention.
Figure 7:
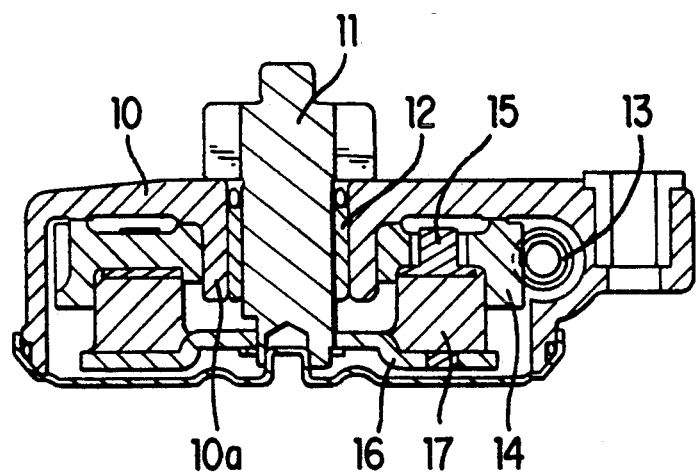
FIG. 7 is a horizontal sectional view of a conventional speed reducing device.

According to the second embodiment shown in FIG. 6, an output gear 5a is pressingly fitted onto an output shaft 5 or may be formed by cutting the output shaft 5. Thus, the output shaft 5 can be inserted into a central hub portion of the casing 1 from the inside thereof. In this construction, the output shaft 5 and a second wheel 6 can be formed together, for example, by insert molding. Therefore, this embodiment does not require the coupling plate 7, which is employed to rigidly connect the output shaft 5 and the second wheel 6 in the first embodiment.

According to the present invention, power is transmitted from the motor shaft through the first wheel, the dampers and the second wheel to the output shaft. The dampers on this transmission line are provided between the protrusions which are radially arranged on the respective wheels and take the above-described complimentary positions. When power is transmitted from the first wheel to the second wheel, the dampers are pressed in the rotational direction between the protrusions to absorb shocks, i.e., to elastically transmit power. Therefore, unlike the conventional art in which a rubber damper is twisted to elastically transmit power, the dampers do not need to be adhered to plates, but they are simply placed between the protrusions. Product quality becomes consistent and reliable. Also, since the plate to which the dampers are adhered is unnecessary, the weight of the device can be reduced.

Further, since the first wheel is supported at its circumferential cylindrical portion having the wheel gear by the second wheel which is rigidly connected to or formed together with the output shaft, the first wheel hardly deforms despite the load caused by the engagement with the worm gear. Thus, smooth power transmission by the gear engagement is ensured. Also, since the second wheel is supported at two sites thereof: its second hub portion by the casing, and its circumferential portion by the first wheel which is supported by the casing 1, the output shaft does not require a bearing which is conventionally required in order to mount the output shaft in the casing. The number of the parts can be reduced and, therefore, the weight of the device can be reduced.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A speed reducing device having an output shaft for outputting power, said speed reducing device comprising:

a casing having a central hub portion;

a worm gear provided on a motor shaft;

a first wheel comprising a plate surface and a first hub portion rotatably supported on an outer periphery of said central hub portion of said casing, a circumferential cylindrical portion of said first wheel having a wheel gear which engages with said worm gear, and at least one protrusion provided on said plate surface of said first wheel and extending in a radial direction;

a second wheel being rigidly connected to said output shaft and comprising a plate surface and a second hub portion rotatably supported on an inner periphery of said central hub portion of said casing, a circumferential cylindrical portion of said second wheel slidably supporting an inner periphery of said circumferential cylindrical portion of said first wheel, and at least one protrusion provided on said plate surface of said second wheel and extending in a radial direction, wherein said plate surface of said second wheel having said protrusion and said plate surface of said first wheel having said protrusion face each other and said protrusion of said second wheel and said protrusion of said first wheel are spaced apart from each other by a predetermined distance; and elastic dampers provided between said protrusion of the first wheel and said protrusion of the second wheel, said elastic dampers contracting to elastically transmit power from said first wheel to said second wheel without placing shearing forces on said elastic dampers;

wherein said protrusion of the first wheel, said protrusion of the second wheel, and said elastic dampers extend in an axial direction relative to said first and second wheels, and said elastic dampers do not extend beyond said protrusions in said axial direction.

2. A speed reducing device according to claim 1, wherein said first wheel and said second wheel each have three angularly spaced protrusions.

3. A speed reducing device according to claim 1, wherein said protrusions of said first wheel are substantially equally spaced between said protrusions of said second wheel.

4. A speed reducing device according to claim 1, wherein said dampers are interconnected by a connecting ring.

5. A speed reducing device according to claim 4, wherein said connecting ring is made of rubber.

6. A speed reducing device according to claim 1, wherein said dampers are elastomeric.

7. A speed reducing device according to claim 1, wherein said dampers are made of rubber.

8. A power transmission device for electrical equipment, comprising:

a first wheel having at least one protrusion extending in a radial direction;

an output shaft for outputting power from said power transmission device;

a second wheel being rigidly connected to said output shaft and having at least one protrusion extending in a radial direction;

means for driving said first wheel; and elastic dampers provided between said protrusion of said first wheel and said protrusion of said second wheel to elastically transmit power from said first wheel to said second wheel without placing shearing forces on the elastic dampers;

wherein said protrusion of said first wheel, said protrusion of said second wheel, and said elastic dampers extend in an axial direction relative to said first and second wheels, and said elastic dampers do not extend beyond said protrusions in said axial direction.

9. A power transmission device according to claim 8, wherein said dampers are elastomeric.

10. A power transmission device according to claim 8, wherein said dampers are made of rubber.

11. A speed reducing device for electrical equipment, comprising:

a casing having a hub portion;

a worm gear provided on a motor shaft;

a first wheel comprising a first hub portion rotatably supported on an outer periphery of said hub portion of the casing, a circumferential cylindrical portion of said first wheel having a wheel gear which engages with said worm gear, and a protrusion provided on a plate surface thereof and extending in a radial direction;

an output shaft for outputting power from said device;

a second wheel being rigidly connected to said output shaft and comprising a second hub portion rotatably supported on an inner periphery of said hub portion of the casing, a circumferential cylindrical portion of said second wheel which slidably supports an inner periphery of said circumferential cylindrical portion of said first wheel, and a protrusion provided on a plate surface thereof and extending in a radial direction, wherein said plate surface of the second wheel having said protrusion and said plate surface of said first wheel having said protrusion face each other and said protrusion of said second wheel and said protrusion of said first wheel are apart from each other a predetermined distance; and rubber dampers provided between said protrusion of the first wheel and said protrusion of the second wheel so as to be contracted to elastically transmit power from said first wheel to said second wheel without placing shearing forces on the rubber dampers;

wherein said protrusion of the first wheel, said protrusion of the second wheel, and said rubber dampers extend in an axial direction relative to said first and second wheels, and said rubber dampers do not extend beyond said protrusions in said axial direction.

* * * * *